C. T. HENDERSON.
MULTIPLE FRICTION DISK DEVICE.
APPLICATION FILED FEB. 1, 1913.
1,265,911.
Patented May 14, 1918.
2 SHEETS—SHEET 1.
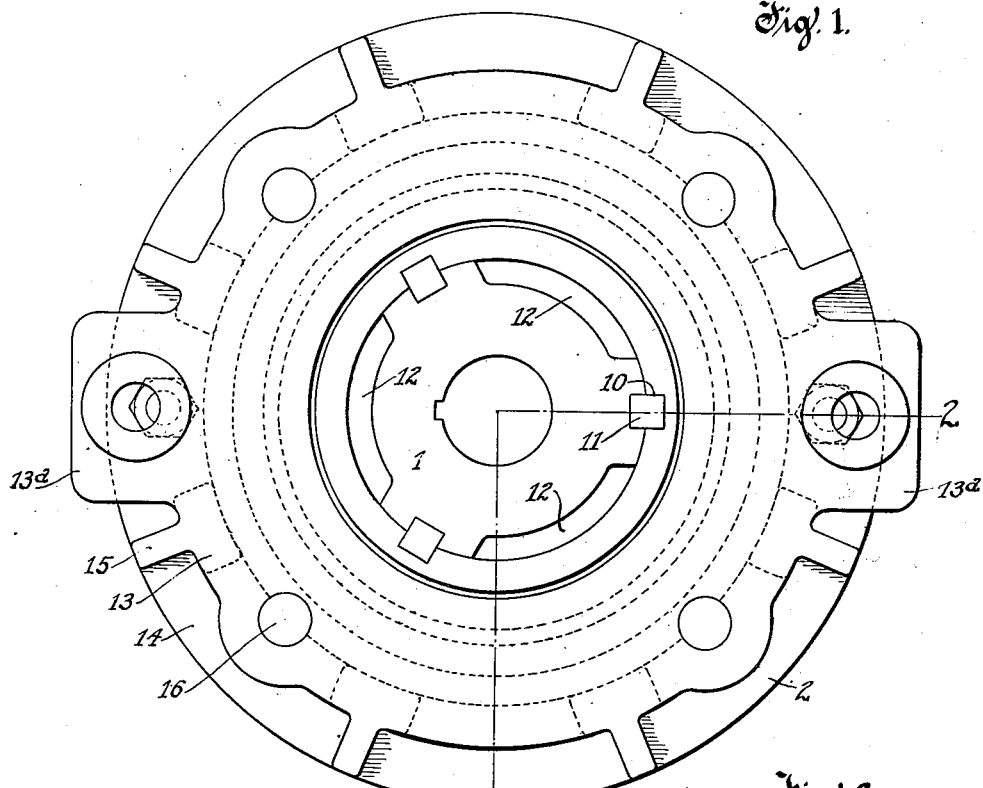
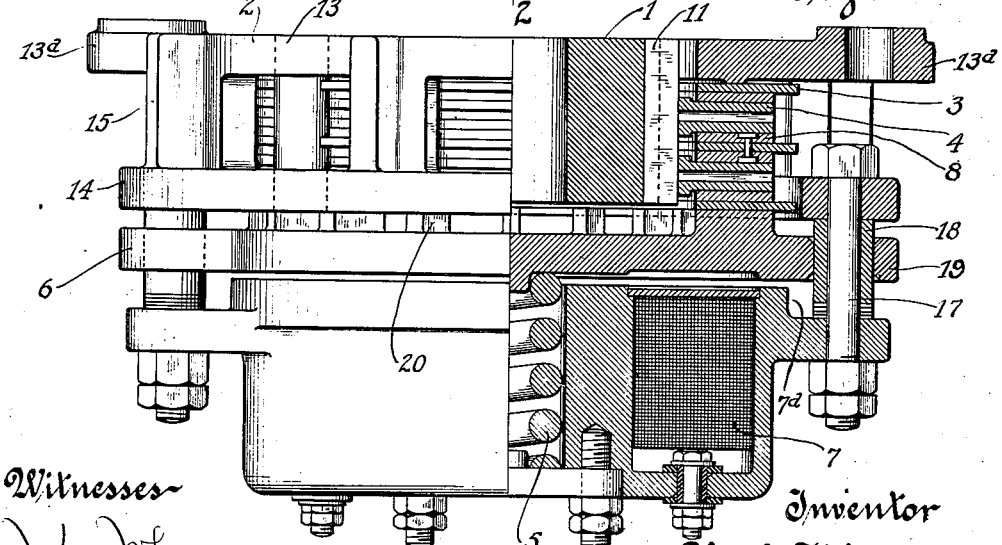

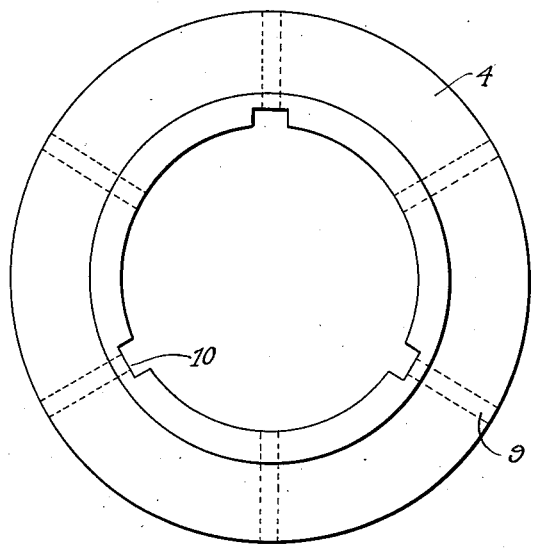
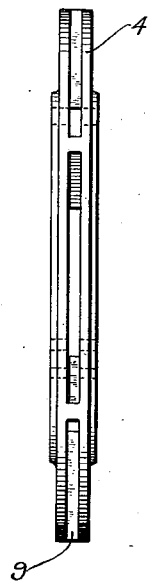
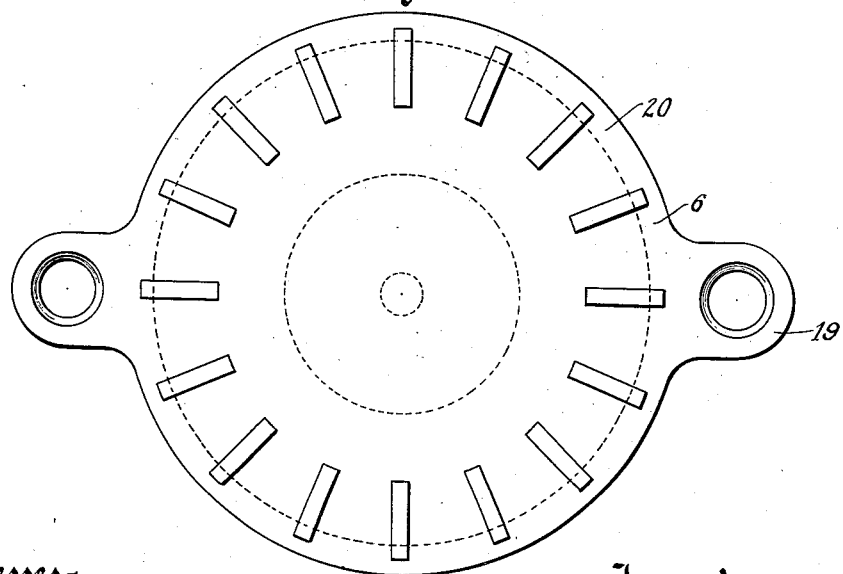

UNITED STATES PATENT OFFICE.

CLARK T. HENDERSON, OF MILWAUKEE, WISCONSIN, ASSIGNOR, BY MESNE ASSIGNMENTS, TO THE CUTLER-HAMMER MFG. CO., OF MILWAUKEE, WISCONSIN, A CORPORATION OF WISCONSIN.

MULTIPLE-FRICTION-DISK DEVICE.

1,265,911.     Specification of Letters Patent.     Patented May 14, 1918.

Application filed February 1, 1913. Serial No. 745,719.

*To all whom it may concern:*

Be it known that I, CLARK T. HENDERSON, a citizen of the United States, residing at Milwaukee, in the county of Milwaukee and State of Wisconsin, have invented new and useful Improvements in Multiple-Friction-Disk Devices, of which the following is a full, clear, concise, and exact description, reference being had to the accompanying drawing, forming a part of this specification.

My invention relates to improvements in multiple disk friction devices. It is particularly applicable to multiple friction disk brakes, although not limited to such a use thereof.

It has among its objects to provide for the ventilation of the disks to prevent undue heating thereof.

It has for a further object to provide magnetic means for relieving the pressure on the disks and in addition exerting a magnetic pull upon certain of the disks to separate the same from the others.

It also has various other objects and advantages which will hereinafter appear.

For the purpose of clearly and fully disclosing my invention I shall describe the brake structure illustrated in the accompanying drawing, which embodies my invention in one form. It is, of course, apparent that certain features of my invention are applicable to other uses and that the structure illustrated is susceptible of modification without departing from the scope of my invention.

In the drawings,

Figure 1 is an elevation of the brake structure.

Fig. 2 is another elevation of structure sectioned on line 2—2, Fig. 1;

Figs. 3 and 4 comprise a plan and edge view of one disk; and,

Fig. 5 is a plan view of the armature of the releasing magnet.

The structure illustrated comprises a hub 1 adapted to be attached to the object to be controlled, a stationary frame 2 and two sets of coöperating friction disks 3 and 4, the former secured to the stationary part and the latter secured to the hub. The friction braking disks are normally pressed together by a spring 5 through the medium of a plate 6, and are adapted to be relieved of the pressure of said spring by an electromagnet 7 through the attraction thereby of the plate 6.

The disks 3 are of ordinary construction, comprising metallic disks having friction rings 8 secured on one or both sides thereof according to their position, the outside disks being provided with a single friction ring while the intermediate disk or disks are provided with friction rings on opposite sides thereof.

The disks 4, however, are of a novel design, being of such construction as to permit free circulation of air therethrough. As best illustrated in Figs. 2, 3 and 4, the disks 4 each comprise two annular plates separated by radial spacers 9 to form between said plates radial extending air passages. The two plates and their spacers may, of course, be formed as a unitary structure and in practice are preferably so formed. As illustrated, each of the disks 4 is provided with six spacers, but of course the number of spacers may be varied as desired. The spacers are preferably of small cross sectional area to provide large ventilating passages without unduly increasing the thickness of the plate.

The disks 4 are preferably arranged to be keyed to the hub and for this purpose are provided with keyways 10 of any suitable number. As shown, there are three keyways in each of the disks 4 and a corresponding number of keyways in the hub 1. These keyways and the keys 11 for locking the hub and disks 4 against relative rotation are best illustrated in Fig. 1. The disks 4 are, of course, free to slide longitudinally of the keys 11.

In practice, the circulation of air through the ventilating passages in the disks 4 may be provided for by perforating the disks 4 near their inner periphery or by reducing the diameter of the hub between the keys 11. The latter construction is preferable and is illustrated in Fig. 1. This construction provides for three large openings 12 between the hub and the disks 4, and, as the stationary frame is of an open construction around its periphery, a free circulation of air through the disks 4 is insured. The several disks 4 are of the same construction whereby a circulation of air is obtained between the adjacent faces of each adjacent pair of stationary disks 3. This provides for thorough ventilation of the brake and consequently avoids overheating or any undesirable heating of the friction parts. The advantages of this construction will of course be obvious to one skilled in the art.

The stationary frame 2 is of a very simple construction, the same comprising two rings 13 and 14 connected by webs 15. In practice it is preferably formed as an integral structure. The ring 13 is formed on diametrically opposite sides with perforated ears or lugs 13ª for attachment thereof to the desired support. The friction disks 3 are secured within the frame by four pins 16 which fit in registering notches in the outer peripheries of the disks and the inner peripheries of the rings 13 and 14.

The magnet structure 7, which may in practice be of any suitable form, is secured to the ring 14 of the frame 2 by bolts 17, said bolts having fitted thereon spacing collars 18 for retaining said magnet frame in a spaced relation with said ring 14. The bolts 17 also support the plate 6, which is acted upon by the spring 5 and which constitutes the armature of the magnet 7. This plate is provided, on diametrically opposite sides, with perforated lugs 19 through which the bolts 17 and their spacing collars 18 pass, thereby supporting the plate in such a manner as to allow the same a lateral movement, or in other words, a movement longitudinally of the bolts. The plate 6 has portions bearing against an outside brake disk 3 and the spring 5 exerts a pressure upon said plate in a direction to press the disks together, thereby causing said disks to exert a braking effect. The magnet, on the other hand, exerts a magnetic pull on the plate 6 in opposition to the spring 5, thereby relieving the pressure on the disks and releasing the brake.

The magnet 7 also magnetically attracts the end disk 3 away from the other disks. This attraction is provided for by maintaining an air gap between the armature plate 6 and the outer pole 7ª of the magnet when the armature plate is attracted. This causes a leakage of the magnetic flux from the outer pole 7ª of the magnet through the bolts 17, which are of magnetic material, and thence through the end disk 3 to the lugs 20 on the armature plate 6, the bushings between the bolts 17 and the plate 6 being of non-magnetic material to cause the flux to take the path described. The stray flux which passes through the end disk 3 is, of course, weak, but it is concentrated to such an extent at the points of engagement between the lugs 20 and the end disk 3 that said disk will be attracted away from the remaining disks. The remaining disks will then quickly space themselves. This provides for a quick release of the brake.

What I claim as new and desire to secure by Letters Patent is:—

1. In a multiple friction disk device, in combination, a frame, a shaft, two sets of friction disks, one set being locked to the shaft, the other set being locked to the frame, the disks being spaced from the shaft for air space, certain of said disks being provided with radial ventilating passages communicating with said space, and the frame having outlets to permit free discharge of air from the passages, a pressure device carried by said frame to effect frictional engagement of said disks and an electromagnet fixed to and supported by said frame to relieve said disks of the pressure of said device.

2. In a multiple friction disk device, in combination, coöperating friction disks, mechanical means for pressing said disks into frictional engagement, an electromagnet for relieving said disks of the pressure of said mechanical means, and means associated with said electromagnet for causing it to also act upon certain of said disks to separate the same magnetically.

3. In a multiple friction disk device, in combination, a frame, a shaft, two sets of coöperating friction disks, one set being locked to the shaft, the other set being locked to the frame, mechanical means for pressing said disks into frictional engagement, an electromagnet for relieving said disks of the pressure of said mechanical means, means associated with said electromagnet for causing it to also act upon certain of said disks to separate the same magnetically, said disks being spaced from said shaft to provide an axial air passage, certain of said disks being provided with radial ventilating passages communicating with said space and the frame having outlets to permit the free discharge of air from the passages.

4. In a multiple friction disk device, in combination, coöperating friction disks, an electromagnet having an armature engaging certain of said disks, mechanical means operating through said armature to press said disks into frictional engagement, said electromagnet magnetically attracting said armature to relieve said disks of the pressure of said mechanical means, and means for diverting a portion of the magnetic flux of said electromagnet through certain of said disks to forcibly separate the same from the remaining disks.

5. In a multiple friction disk device, in combination, coöperating friction disks, an electromagnet having an armature engaging certain of said disks, mechanical means operating through said armature to press said disks into frictional engagement, said electromagnet magnetically attracting said armature to relieve said disks of the pressure of said mechanical means, and means for diverting a portion of the magnetic flux of said electromagnet through certain of said disks to separate the same from the remaining disks, and said armature having an irregular surface adjacent to said disks to concentrate at a number of points the magnetic flux diverted through the same.

6. In a friction disk brake, in combination, a frame comprising a pair of spaced rings, a set of friction disks carried thereby, a rotatable member within said frame, a set of friction disks carried thereby to coöperate with said former disks, an annular electromagnet secured to one side of said frame, an armature plate for said electromagnet supported between said magnet and said frame to be moved toward said disks and to be attracted away from the same by said magnet, said armature being provided on one face with a plurality of spaced lugs to engage the outer one of said disks and to concentrate at corresponding points the magnetic flux leaking through said disks, and mechanical means exerting a pressure upon said armature to press said disks into frictional engagement.

In witness whereof, I have hereunto subscribed my name in the presence of two witnesses.

CLARK T. HENDERSON.

Witnesses:
FRANK H. HUBBARD,
LEONARD A. WATSON.